United States Patent [19]

Simm et al.

[11] 4,447,488

[45] May 8, 1984

[54] SHAPED ARTICLE OF A SYNTHETIC RESIN AND/OR NATURAL RUBBER AND PROCESS FOR THE PRODUCTION THEREOF

[75] Inventors: Manfred Simm, Troisdorf; Karl-Heinz Spiess, Much; Richard Weiss, Troisdorf, all of Fed. Rep. of Germany

[73] Assignee: Dynamit Nobel Aktiengesellschaft, Troisdorf, Fed. Rep. of Germany

[21] Appl. No.: 341,166

[22] Filed: Jan. 21, 1982

Related U.S. Application Data

[63] Continuation of Ser. No. 150,293, May 16, 1980, abandoned.

[30] Foreign Application Priority Data

May 31, 1979 [DE] Fed. Rep. of Germany ....... 2922089

[51] Int. Cl.³ .................... B32B 7/02; B32B 25/04
[52] U.S. Cl. .................... 428/213; 204/159.12; 428/220; 428/409; 428/423.1; 428/423.3; 428/421; 428/422; 428/447; 428/492; 428/493; 428/521; 428/522; 428/523; 428/217

[58] Field of Search ............ 428/492, 409, 493, 220, 428/521, 522, 523, 213, 421, 422, 447, 419, 423.1, 423.3, 217; 204/159.12; 427/43.1, 44; 156/275.5

[56] References Cited

U.S. PATENT DOCUMENTS 3,597,372  8/1971  Cook .......................... 204/159.12
3,860,505  1/1975  Tarney ........................ 204/159.12
4,221,253  9/1980  Seiberling ..................... 428/492
4,337,768  7/1982  Hatada ........................ 428/409

FOREIGN PATENT DOCUMENTS 816024  7/1959  United Kingdom .

Primary Examiner—Ellis P. Robinson
Attorney, Agent, or Firm—Antonelli, Terry & Wands

[57] ABSTRACT

A shaped article of a polymeric material has a shaped structure containing at least one polymeric component which is weldable, e.g. by heat, and at least one polymeric component which can be crosslinked by high-energy radiation. The crosslinkable polymeric component is homogeneously distributed within the shaped structure and is crosslinked at least partially in a part of the shaped structure, including at least a portion of the shaped structure.

15 Claims, 9 Drawing Figures

SHAPED ARTICLE OF A SYNTHETIC RESIN AND/OR NATURAL RUBBER AND PROCESS FOR THE PRODUCTION THEREOF

This is a continuation of application Ser. No. 150,293, filed May 16, 1980 now abandoned.

This invention relates to a shaped article of a synthetic resin and/or natural rubber, optionally provided with fillers and additives, containing at least one component which can be crosslinked by means of high-energy radiation, as well as to a process for the production of the shaped article, starting with a component shaped, for example, by rolling, calendering, injection-molding, extrusion, pressing, extrusion blow molding, coating, or the like.

It is known that numerous synthetic resins and also natural rubber can be crosslinked to a greater or lesser density by irradiation with high-energy radiation or rays. High-energy or also ionizing rays are understood to mean X-rays and gamma rays, rays of electrons, neutrons, and atomic nuclei, as well as electron rays and ion rays from particle accelerators. The changes obtained in the synthetic resin, which in the final analysis lead to crosslinking, depend, with given external conditions, only on the dose of the radiation. The radiation dose is understood to mean the quantity of energy absorbed per gram of material; it is measured in rad. Greater details can be derived, for example, from *Kunstostoff-Handbush* [*Plastics Manual*] *Vol. IV, "Polyolefins", Carl Hanser publishers, Munich* (1969): 169–179. In addition to the chemical effect manifested by the crosslinking, changes in physical properties also occur in the irradiated synthetic resins. In this regard, the improvement in strength properties at elevated temperature is especially of technical interest, since due to the crosslinking of the synthetic resins the functional capacity thereof is considerably increased and thus the field of application for such resins can be correspondingly widened. The positive properties attained, on the one hand, with the crosslinking of the synthetic resin are, however, obtained at the cost of accompanying phenomena which are not always desirable, including particularly a loss of weldability, i.e. crosslinked synthetic resins can no longer be sufficiently welded or bonded together either thermally or with solution welding agents or solvents. Therefore, the use of crosslinked synthetic resins is limited in those technical fields of application where it is, however, necessary to use a maximally simple joining technique for shaped articles of synthetic resins. We point here, for example, to the field of sealing sheets of synthetic resins for building construction and groundwork engineering, as explained comprehensively in DOS [German Unexamined Laid-Open Application] No. 2,628,741, for example. Sealing sheets must meet high requirements with respect to watertightness, weatherability, and mechanical strength, which basically cannot be fulfilled by an individual synthetic resin.

Conventional thermoplastic sealing sheets on the basis of soft polyvinyl chloride, polyisobutylene, acrylic polymers, or bitumen-modified thermoplastics can be welded tightly at the seams in a simple and flawless fashion, but exhibit the disadvantages of being sensitive to temperatures, becoming soft, and tending toward cold flow. These disadvantages are then sought to be counteracted by the addition or incorporation, by laminating, of reinforcing inserts of, for example, fabrics or nonwoven mats of textile fibers or glass fibers. The sealing sheets of vulcanizable synthetic resins, which are conventional on the other hand, for example those based on a chloroprene elastomer, ethylene-propylenediene terpolymers, a chlorosulfonated polyethylene elastomer, or a butyl elastomer, however, do satisfy the requirements for mechanical strength and are weather-resistant. These sheets have the disadvantage, though, that the vulcanized sealing sheets cannot be welded together and can be joined in a permanently tight fashion only with difficulties when using adhesives or adhesive strips; see, for example, DOS No. 2,510,162 or DAS [German Published Application] No. 2,233,199.

An intermediate position is here occupied by sealing sheets based on a thermoplastic synthetic resin having elastomeric properties. In the sealing sheet according to DOS No. 2,621,825, for example, the complete vulcanization is to take place only after the sheets are laid at the building site and after seam joints have been established between the sealing sheets; however, there is the danger of a premature completion of vulcanization, whereby then the simple production of welded seam junctions is, in turn, made impossible. Moreover, it is impossible to carry out a welding operation during subsequent repair work.

In recent times, the procedure has also been adopted to produce multiple-layer sealing sheets of vulcanizable materials, instead of the aforedescribed single-layer synthetic resin sealing sheet, built up homogeneously of one material and optionally provided with a reinforcing insert; in this case, only an inner layer contains a vulcanization accelerator and the outer layer is free of vulcanization accelerator and thus can still be welded thermally, i.e. by heat and/or by solvents or by solution welding agents; see DOS No. 2,628,741.

A disadvantage of these multiple-layer sealing sheets is simply the increased technical expenditure, in that these individual sheets must be produced which must be laminated together in further process steps, without the occurrence of a premature vulcanization, in order to arrive at the desired product, which product, on the one hand, exhibits sufficient mechanical strengths even at elevated temperatures and, on the other hand, permits the use of joining technique by welding.

However, even for shaped articles other than sealing sheets, it may be desirable and advantageous to provide, in addition to the properties of a synthetic resin attainable, on the one hand, only by crosslinking, simultaneously still other properties attainable only in the non-crosslinked condition of the synthetic resin. This approach is adopted by the thermoplastic mixture for the preparation of shaped articles proposed in DAS No. 2,202,738, wherein a vulcanizable, elastomeric copolymer is homogeneously distributed in a thermoplastic mixture, and this mixture, in total, is vulcanized merely partially, i.e. incompletely. This incomplete vulcanization is attained by a correspondingly low addition of vulcanizing agent. The thus-obtained thermoplastic mixtures still have, to a limited extent, thermoplastic properties in addition to elastomeric properties. The weldability, however, is no longer present in such mixtures.

The invention is based on the object of providing a shaped article of a synthetic resin which, on the one hand, exhibits the advantageous properties achieved by crosslinking of a synthetic resin and, on the other hand, especially also still displays the weldability of the thermoplastics required for a simple joining technique. This object has been attained, in a shaped article according to this invention by providing a crosslinkable component that is homogeneously distributed in the material, i.e. in the synthetic resin or natural rubber of the shaped article and by crosslinking this component at least partially by means of high-energy radiation only in a portion of the shaped article, including a portion of the entire surface.

The shaped article of this invention has the advantage that it is based on a single, homogeneous batch of material and thus can be produced in a single working step, and yet exhibits, in separate zones, on the one hand the characteristics of the non-crosslinked synthetic resin and, on the other hand, the properties of the synthetic resin attainable by crosslinking. This is made possible by the use of a component of synthetic resin or natural rubber which can be crosslinked by high-energy rays, so that the shaped article of this invention can be left free of crosslinking agents. In the shaped article of this invention, which is homogeneous with respect to the batch of material, a crosslinking of a portion of the shaped article can be effected at any desired point in time, wherein this partial region or portion to be crosslinked is likewise freely selectable with respect to its size. Preferably, the shaped article is at least partially crosslinked over part of its thickness starting from one side surface, e.g. an upper surface. With the use of a synthetic resin which can be heat-sealed and/or welded by solution or welding agents in the non-crosslinked condition, the shaped article of this invention can then also still be welded on the surface which has not been crosslinked, by heat and/or by a solution or swelling agent, in contrast to the crosslinked surface zone which has lost its weldability due to crosslinking.

Depending on the component utilized, which can be crosslinked by high-energy radiation, the shaped article of this invention exhibits the increased strength required for many fields of application, especially also at an elevated temperature, while simultaneously exhibiting a homogeneous structure.

Preferred crosslinkable components according to the invention are weldable synthetic resins which can be crosslinked by means of high-energy radiation, wherein the crosslinking is preferably conducted by means of accelerated electron rays. These weldable synthetic resins are understood to include, in particular, synthetic resins such as those of rubbery copolymers of ethylene, at least one other olefin of the formula $CH_2=CHR$ or $CH_2=CH-R-CH=CH_2$ wherein R is an alkyl group or an alkylene group of 1–12 carbon atoms, and optionally a polyolefin, such as, for example, ethylenepropylene-diene terpolymer or ethylene-propylene copolymer; natural rubber, a styrene-butadiene elastomer, a polybutadiene elastomer, a polyisoprene elastomer, polyethylene, an ethylene-vinyl acetate copolymer, acrylonitrile-butadiene-styrene terpolymer, a styrene-butadiene-elastomer block copolymer, a styrene-isoprene-elastomer block copolymer, a neoprene elastomer, a nitrile elastomer, a polysulfide elastomer, a chlorinated polyethylene, a polyurethane, a vinylidene copolymer, a silicone rubber, vinyl-silicone rubber, a polyacrylate, a chlorosulfonated polyethylene, a fluorosilicone elastomer, polyvinyl chloride, polypropylene, a butyl elastomer, epichlorohydrin, epichlorohydrinethylene oxide, a polyacrylamide, or a polyamide.

The shaped article can be produced exclusively from the weldable components crosslinkable by high-energy radiation, of blends of these crosslinkable components with one another, as well as blends thereof with non-crosslinkable synthetic resins. In general, from 3 to 95 parts by weight of a crosslinkable resin component are admixed with a non-crosslinkable resin component. Moreover, the shaped article can contain additives such as fillers, e.g. carbon blacks, silicate fillers, chalk, and others, plasticizers, stabilizers, anti-aging substances, coloring agents, lubricants, and others. Also the use of blowing agents is possible so that foamed shaped articles can be produced in accordance with the present invention. The shaped article proper initially can be manufactured, i.e. formed and shaped, in a conventional way, for example by extrusion, rolling, calendering, injection-molding, pressing, extrusion blow molding, coating or other known process techniques, such as, for example, spreading operations conducted by means of pastes.

A preferred embodiment of the shaped article of this invention is comprised of flat structures, such as films, sheets, or panels, wherein the construction of a sheet resistant against the effects of water and weathering is of paramount importance. For it is possible by using this invention to provide a sheet for sealing purposes which, on the one hand, is still weldable and thus permits a simple and safe joining technique to be performed, and which on the other hand, exhibits the properties of the crosslinked synthetic resin, especially weatherability and high tear strength, even at elevated temperatures. The sheets to be utilized for sealing purposes consist preferably of a rubbery copolymer of ethylene, at least one other olefin of the formula $CH_2=CHR$ or $CH_2=CH-R-CH=CH_2$ wherein R represents an alkyl or alkylene group of 1–12 carbon atoms, and optionally a polyolefin, especially an ethylene-propylene-diene terpolymer (EPDM) and/or ethylene-propylene copolymer.

It may be advantageous for the practical usage of the shaped articles of this invention to mark the surface zones of the shaped articles which are crosslinked and/or which are not crosslinked. This can be done, for example, by embossing, imprinting or coloring a corresponding surface region of the article. The color marking can be effected, for example, by dyeing the shaped article with, in particular, organic dyes which, due to the irradiation required for crosslinking, turn color, i.e. are altered so that crosslinked and non-crosslinked surface zones are immediately recognizable.

Further fields of application of the shaped articles according to the invention are, for example, profiles or other structures, such as railings, bumpers, decorative moldings, etc., which are joined, for example, with other materials into a composite article. In this connection, the crosslinked zone of the profile member can form the outside surface that is accessible to wear; whereas the non-crosslinked surface zone is joined to a base construction, for example by welding or laminating.

The process for the production of a shaped article according to the invention starts with a shaped article formed from a synthetic resin or natural rubber optionally provided with fillers and additives, containing at least one component crosslinkable by means of high-energy radiation, which shaped article is manufactured, for example, by rolling, calendering, injection-molding, extrusion, pressing, extrusion blow molding, coating or the like. According to the invention, the shaped article is at least partially crosslinked by means of high-energy radiation, starting from at least a part of the entire surface of the article and only over part of the cross section of the article. For example, a sheet or planar panel may have a major portion of one side exposed to high energy radiation so that this portion of the article is crosslinked through the entire cross section; whereas the remaining unexposed portion is not crosslinked.

The process of this invention has the advantage that in a shaped article manufactured in a one-step manufacturing process and consisting of a batch of homogeneous material, a portion can be crosslinked while the remainder of the shaped article can be left without being crosslinked. Preferably, the process of this invention is conducted by exposing the shaped article on one surface side to a high-energy radiation to such an extent that the crosslinkable components are at least partially crosslinked in the zone up to a desired penetration depth of the rays into the shaped article which, however, is selected to be smaller than the thickness of the shaped article. It is known that the penetration depth of the various types of radiation depends on the energy level of the radiation. Preferably, the process of this invention is effected by means of accelerated electron rays. The determining factor for the extent of crosslinking is, with given external conditions, only the radiation dose level, i.e. the amount of energy absorbed per gram of synthetic resin. This radiation dose can be adjusted, for example, by varying the acceleration voltage for the high-energy rays, by changing the distance between the source of radiation and the surface of the shaped article, by means of a preliminary absorber, for example a thin metal foil, or by varying the angle of incidence of the rays on the surface of the shaped article. The preliminary absorber is arranged between the source of radiation and the surface to be irradiated, for example, an aluminum foil or a copper foil acts as a preliminary absorber. Depending on the radiation dose, a more or less extensive crosslinking of the synthetic resin occurs in the region of the penetration depth of the rays. The degree of crosslinking can be determined, for example, with the decahydronaphthalene solubility test for the proportions which have remained without crosslinking, and thus with given conditions is reproducible and variable.

In the shaped article, by the irradiation, only those components are crosslinked which lend themselves to crosslinking; for example fillers, such as silicates, carbon black, etc. are not crosslinked.

The crosslinkable component or components can be crosslinked to an extent of up to 100%, depending on the radiation dose, i.e. from partially crosslinked to completely crosslinked. The fillers also have an effect on the crosslinking process, for example, insofar as they make the penetration of radiation difficult, since, the higher the density of the material of the shaped article, the stronger is the slowing-down effect on the high-energy rays.

The invention will be described in greater detail in the accompanying drawing and with reference to examples set forth below. In the drawings:

FIG. 1 shows schematically a cross section of a plate-shaped, not yet crosslinked, homogeneous article 1 made of a synthetic resin molding composition, wherein this molding composition contains at least one component crosslinkable by means of high-energy radiation, which component is preferably crosslinked with the use of accelerated electrons.

Depending on the function of the shaped article, here a plate, and the desired degree of crosslinking, the crosslinkable component can amount to preferably between 5% and 100% by weight of the shaped article 1. It can be seen from the illustration of FIG. 2 that the high-energy rays 2 act on the plate-shaped molded article 1 only over part of its surface, namely the surface of side A. The surface of side B is not irradiated. In FIG. 3, the cross section of the shaped article 1 formed according to this invention is then illustrated, which article has been crosslinked only over part of its cross section and part of its surface, namely in the marked zone 1A, while the partial zone 1B with the surface of side B remains non-crosslinked. The degree of crosslinking achieved in zone 1A depends, as explained above, on the one hand on the radiation dose, and on the other hand on the weight proportions of the crosslinkable components. For example, if the shaped article 1 consists of 100% by weight of a crosslinkable synthetic resin, such as EPDM, for example, then it is possible also to attain complete crosslinking in zone 1A.

Figure 1:
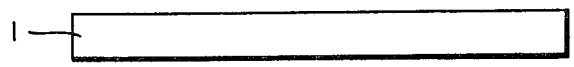
FIG. 1 is a cross sectional view through a plate-shaped, homogeneous, non-crosslinked shaped article.
Figure 2:
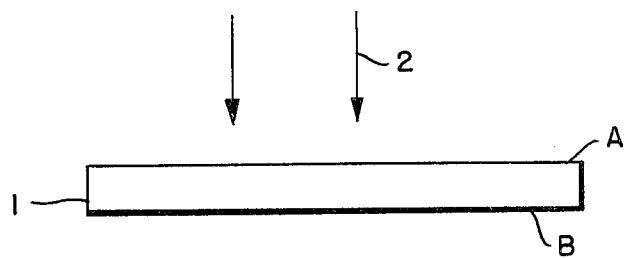
FIG. 2 shows the irradiation of the shaped article of FIG. 1.
Figure 3:
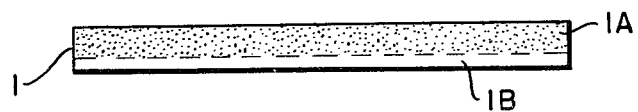
FIG. 3 is a cross section through the irradiated shaped article of FIG. 2.
Figure 4:
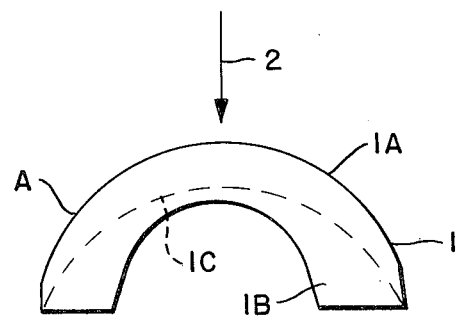
FIG. 4 shows the cross section of a shaped article having a semicircular profile cross section.

FIG. 4, in a deviation from the plate-shaped articles in FIGS. 1–3, shows a shaped article 1 with a profiled cross section including a curved surface, which can be formed in accordance with this invention. It will be recognized that the invention is not only applicable to planar structures but also, for example, to shaped articles having curved surfaces as shown in FIG. 4. If the high-energy rays 2, as depicted in FIG. 4, act on the shaped article 1 only from one direction, then, depending on the varying angle of incidence, i.e. angle of impingement of the rays 2 on the surface A of the shaped article 1, a differing penetration depth of the rays and, therefore, a corresponding amount of crosslinking are achieved. The larger the distance from the source of radiation to surface A, the smaller the penetration depth of the rays of, for example, accelerated electrons.

The dashed line 1C here represents the imaginary separating line between the crosslinked zone 1A and the region 1B of the shaped article 1 which has remained in a non-crosslinked state or condition.

Figure 5:
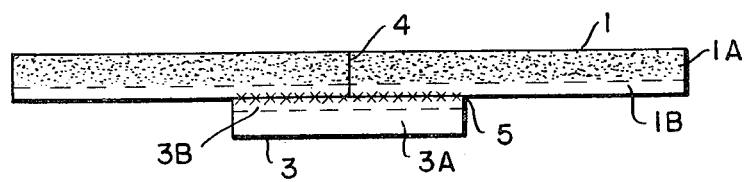
FIGS. 5 and 6 show various seam joints in cross section.
Figure 6:
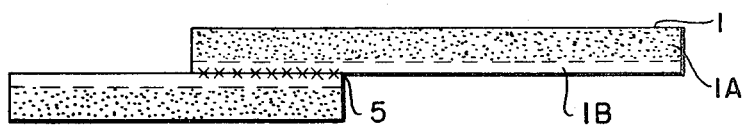

If, now, weldable, i.e. heat-sealable or solvent or swelling-agent-weldable, components are utilized for forming the shaped article which has a portion in the non-crosslinked condition, then the shaped articles which, according to the invention, are crosslinked only in partial zones, also offer the possibility of utilizing joining techniques with the aid of welding bonds, as illustrated in two embodiments in FIGS. 5 and 6. The shaped articles 1 are synthetic resin sheets, for example, which, as shown in cross section in FIG. 5, are to be bonded together with the formation of a butt joint 4. The sheets are arranged in side-by-side relationship so that in each case the non-crosslinked zone 1B of the sheets with the non-crosslinked surfaces is arranged on one side and the crosslinked zones 1A are located on the opposite side. A seam joint is then established with the aid of the bonding strip 3 which either consists completely of non-crosslinked, weldable synthetic resin or has the same initial non-crosslinked structure as sheet 1. In this case, the seam strip 3 is applied with a non-crosslinked side 3B to the non-crosslinked surfaces B of the sheets 1 and welded together, for example, by means of solution welding agent 5. The use of a seam strip 3 with the same structure as the sheets 1 has the advantage that also the crosslinked zone 3A of the same strip contributes toward reinforcing the seam joint in total.

FIG. 6 shows, in cross section, a lap joint with weld seam 5 of sheet-like shaped articles 1 constructed according to this invention. Here again, the non-crosslinked surface zones of the sheets 1 are joined in the overlapping zone. The sheets 1 according to FIGS. 5 and 6 can be produced, for example, from EPDM by calendering, rolling, or extrusion and are usable, for example, as sealing sheets for covering flat roofs. The seam joints illustrated in FIGS. 5 and 6 are only exemplary. It is to be pointed out additionally that the shaped articles 1 of the structure according to the invention can also be joined with their non-crosslinked side, to other materials, e.g. metal foils, metal sheets, glass mats, textile fabrics, etc.

Figure 7:
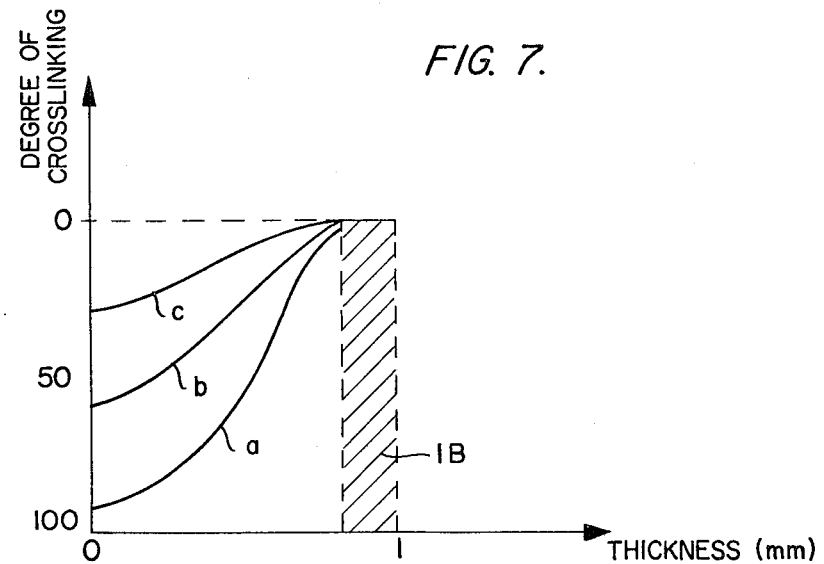
FIG. 7 shows a schematic graphic view of the extent of crosslinking in percent of the shaped article with varying radiation doses.

FIG. 7 shows schematically the dependence of the attainable degree of crosslinking on the radiation dose. In this connection, the shaped article is one having a plate shape and a thickness of 1 mm., the residual thickness of which in the shaded zone 1B remains non-crosslinked. Depending on the size of the radiation dose a, b or c, a higher or lower crosslinking is attained which additionally decreases with the penetration depth. Considering the crosslinkable component proportion of a shaped article, then this crosslinkable component, depending on the radiation dose, can be crosslinked partially in wide ranges and up to 100%.

Figure 8:
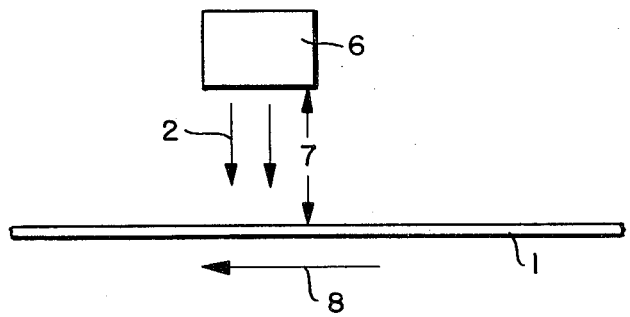
FIGS. 8 and 9, respectively, show schematic views of two embodiments of the process of irradiation of the shaped article.
Figure 9:
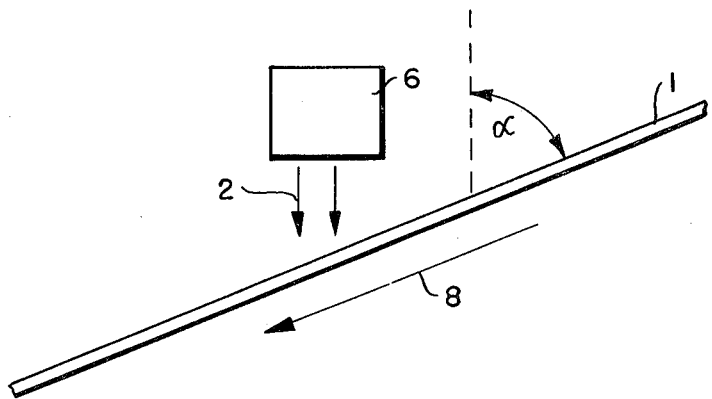

The production of a shaped article that is at least in part crosslinked and that is formed according to this invention is illustrated relatively simply in a schematic view in FIGS. 8 and 9. The shaped article 1, for example a sheet or a plate, is manufactured according to conventional methods and thereafter, for irradiating with high-energy rays, guided past the radiation source 6 at the distance 7 in the direction of arrow 8. The high-energy rays 2, preferably rays of accelerated electrons, act on the shaped article with an intensity depending on the given conditions, such as acceleration voltage of the radiation source 6, spacing 7 between radiation source and shaped article 1, and penetrate more or less deeply from one side into the shaped article 1, effecting a corresponding crosslinking of the crosslinkable component. By enlarging, for example, the distance 7 between the shaped article 1 and the radiation source 6, the penetration depth of the rays 2 into the shaped article 1 is reduced, since the air space 7 already acts as a preliminary absorber and results in a slowing down of the electrons.

The radiation energy absorbed in the shaped article 1 can, however, also be varied by changing the angle of incidence $\alpha$ of the rays 2 on the surface of the shaped article, as schematically illustrated in FIG. 9.

The manufacture of shaped articles according to this invention will be explained in even greater detail with reference to the following examples wherein the angle of incidence 2 is 90° unless otherwise specified:

EXAMPLE 1

Production of a sheet crosslinked only over part of its thickness from one side of the surface.

In a ram-type masticator, the following recipe components are mixed at 170° C.:
100 parts by weight EPDM ("Keltan" 712 by DSM, NL)
1 parts by weight stearic acid
60 parts by weight carbon black FEF [fast extruding furnace]
40 parts by weight silicic acid anhydride and kaolinite ("Sillitin")
60 parts by weight paraffinic mineral oil ("Sunpar" 160 by Sunoil Comp.)
5 parts by weight zinc oxide To improve homogenization of the components, the thus-obtained mixture is introduced for another 10 minutes at 180° C. into a rolling mill and then fed via a strainer to a calender. The sheet manufactured therein at 180° C. at a speed of 5 m./min., having a thickness of 1.2 mm., is crosslinked in partial zones in an electron beam unit under the following conditions:

| Acceleration voltage | 500 kev |
| Beam amperage | 60 mA |
| Transport velocity of sheet | 3.5 m./min. |
| Surface dose | 16 Mrad (million rad) |
| Distance between scanner window and sheet surface | 17 cm. |

The irradiated sheet was crosslinked from one side up to a thickness of 1.1 mm.; a residual thickness of 100$\mu$ remaining non-crosslinked. The thus-obtained sheet can be solution-welded with tetrachloroethylene on its non-crosslinked side and has, at 80° C., a tear strength of 3.5 N/mm$^2$. In contrast thereto, the completely non-crosslinked sheet has, at 80° C., only a tear strength of 0.1 N/mm$^2$. This sheet is excellently suitable as a sealing panel.

EXAMPLE 2

Under the same process conditions as set forth in Example 1, a sheet having a thickness of 1.0 mm. is produced from the following, unfilled recipe:
100 parts by weight EPDM ("BUNA" AP 451 by Chem. Werke Hüls)
5 parts by weight zinc oxide
1 parts by weight stearic acid
140 parts by weight paraffinic mineral oil (Guld Oil 2212)
4 parts by weight "Polywax 6000"

Crosslinking in only a partial zone of the sheet is obtained with the following irradiating conditions in an electron radiation device:

| Acceleration voltage | 400 kev |
| Beam amperage | 60 mA |
| Transport velocity of sheet | 5 m./min. |
| Surface dose | 16 Mrad |
| Distance between scanner window and sheet surface | 12 cm. |

The irradiated sheet is crosslinked from the irradiated side up to a penetration depth of 850$\mu$; a residual thickness of 150$\mu$ remain without crosslinking.

EXAMPLE 3

The following recipe components are mixed in a fluid mixer at 120° C. over a period of 20 minutes, introduced into a calender by way of a twin-shaft processing machine and a strainer, and processed to a sheet having a thickness of 1.5 mm. at 200° C. and at 3 m./min.:

100 parts by weight ("BUNA" AP 447) EPDM
5 parts by weight zinc oxide
2 parts by weight stearic acid
40 parts by weight ("Sunpar" 150) paraffinic mineral oil
40 parts by weight atactic polybutene
70 parts by weight ("Corax" A (Degussa)) carbon black
220 parts by weight ("Sillitin" Z) silicic acid anhydride and Kaolinite
5 parts by weight Dispersant DS To crosslink the sheet only over a partial zone thereof, i.e. only over part of its thickness, the following conditions are maintained in the electron radiation unit:

| | |
|---|---|
| Acceleration voltage | 750 kev |
| Beam amperage | 60 mA |
| Transport velocity of sheet | 4 m./min. |
| Surface dose | 12 Mrad |
| Distance between scanner window and sheet surface | 17 cm. |
| Preliminary absorber between scanner window and sheet surface | 0.3 mm. aluminum foil |

EXAMPLE 4

The following recipe is processed as in Example 1 to a sheet having a thickness of 1 mm.:

50 parts by weight chlorosulfonated polyethylene "Hypalon" 40 by DuPont
50 parts by weight chlorosulfonated polyethylene "Hypalon" 20 by DuPont
4 parts by weight magnesium oxide
10 parts by weight $TiO_2$
150 parts by weight calcium carbonate
60 parts by weight chlorinated paraffin 70%.

To obtain the required strength by the crosslinked layer, a surface dose of 10 Mrad is necessary. This dose is attained with the following conditions and this sheet is irradiated and crosslinked in partial zones by means of an electron radiation unit:

| | |
|---|---|
| Acceleration voltage | 400 kev |
| Beam amperage | 25 mA |
| Transport velocity of sheet | 3.5 m./min. |
| Surface dose | 10 Mrad |
| Distance between scanner window and sheet surface | 17 cm. |

The thus-obtained, irradiated sheet is crosslinked over a thickness of 850μ, while a residual thickness of 150μ remains non-crosslinked. The sheet now has, at 80° C., still a tear strength of 2.8 N/mm² as compared to the completely non-crosslinked sheet which, at 80° C., has only a tear strength of 0.3 N/mm². The non-crosslinked surface of the sheet is still weldable, so that the simple joining technique can be employed, and joints can be obtained by means of welding.

EXAMPLE 5

Under the same process conditions as in Example 1, a transparent sheet is manufactured having a thickness of 3 mm. from the following recipe:

100 parts by weight ("BUNA" AP 447) EPDM
4 parts by weight "Polywax" 6000
250 parts by weight paraffinic mineral oil To insure partial crosslinking over the thickness and thus weldability afforded by a non-crosslinked side, the following conditions are maintained during irradiation with accelerated electrons:

| | |
|---|---|
| Acceleration voltage | 900 kev |
| Beam amperage | 100 mA |
| Transport velocity | 4 m./min. |
| Distance between scanner window and substrate | 17 cm. |

What is claimed is:

1. A sheet of a synthetic resin or natural rubber, provided with fillers and additives other than vulcanization accelerators, which comprises a sheet of said synthetic resin or natural rubber containing 3 to 95% by weight of at least one polymeric component which is weldable by heat and/or by solvents or swelling agents, and which is crosslinkable by high-energy radiation, said polymeric component being provided in a homogeneous distribution within the sheet and being crosslinked, at least partially, over a selected portion of the thickness of said sheet starting from one exposed side surface of said sheet that has been subjected to high-energy radiation and extending into the interior of said sheet, said polymeric component in said selected portion being sufficiently crosslinked to provide greater weather resistance and tear strength to said portion and to lose its weldability, and the polymeric component, in that portion of the sheet including another exposed side surface, which has not been crosslinked by being subjected to high-energy radiation, remaining weldable by heat and/or by solvents or swelling agents to provide weldability to said another exposed side surface of said sheet, whereby a sheet having an exposed side surface with greater weather resistance and another exposed side surface that remains weldable is provided.

2. A sheet according to claim 1 wherein the crosslinkable component consists of a material which can be welded and also can be crosslinked by means of accelerated electron rays and which is at least one of an elastomeric copolymer prepared from a monomeric mixture of ethylene, at least one other olefin of the formula $CH_2=CHR$ or $CH_2=CH—R—CH=CH_2$ wherein R is an alkyl or alkylene group of 1–12 carbon atoms, and optionally a polyolefin.

3. A sheet to claim 1 wherein said crosslinkable component is ethylenepropylene-diene terpolymer or ethylene-propylene copolymer; a natural rubber, a styrene-butadiene elastomer, a polybutadiene elastomer, a polyisoprene elastomer, a polyethylene, ethylene-vinyl acetate copolymer, acrylonitrile-butadiene-styrene copolymer, a styrene-butadiene-elastomer block copolymer, a styrene-isoprene-elastomer block copolymer, a neoprene elastomer, a nitrile elastomer, a polysulfide elastomer, a chlorinated polyethylene, a polyurethane, a vinylidene copolymer, a silicone rubber, a vinyl-silicone rubber, a polyacrylate, a chlorosulfonated polyethylene, fluorosilicone rubber, a polyvinyl chloride, a polypropylene, butyl elastomer, an epichlorohydrin, an epichlorohydrin-ethylene oxide, polyacrylamide or polyimide.

4. A shaped article according to claim 1 wherein said structure is formed as a sheet resistant to the effects of water and weathering.

5. A sheet according to claim 4, wherein the sheet consists of an elastomeric copolymer of ethylene, at least one other olefin of the formula $CH_2=CHR$ or $CH_2=CH-R-CH=CH_2$ wherein R is an alkyl or alkylene group of 1–12 carbon atoms, and optionally a polyolefin.

6. A sheet according to claim 1, wherein said polymeric component is crosslinked up to 100%, the selected portion of the thickness of the structure is a major part of the thickness of said structure and the portion of the structure including another exposed side surface is a thin layer on said structure that is weldable.

7. A process for the production of a sheet material having weather resistance from a polymeric material, provided with fillers and additives other than vulcanization accelerators, said material containing 3 to 95% by weight of at least one polymeric component crosslinkable by high-energy radiation and weldable by heat and/or by solvents or swelling agents homogeneously distributed therein, which comprises subjecting a selected portion of an exposed surface of the sheet material containing said crosslinkable polymeric component to high-energy radiation to at least partially crosslink the crosslinkable polymeric component; crosslinking of the polymeric component extending from an exposed surface of the sheet material into a part of the thickness of the entire cross section of the sheet material underlying said exposed surface, with the polymeric component being sufficiently crosslinked to lose its weldability and to provide greater weather resistance and tear strength to said selected portion of the sheet material, and the polymeric component in that portion of the entire cross section of the sheet material, which has not been crosslinked by the high-energy radiation, remaining weldable to provide another exposed surface of said sheet material that is weldable by heat and/or by solvents or swelling agents, whereby a sheet material having an exposed surface with greater weather resistance and another exposed surface that remains weldable is formed.

8. A process according to claim 7, wherein the sheet is exposed on one surface side to high-energy radiation to such an extent that the crosslinkable component is at least partially crosslinked in the zone up to a desired penetration depth of the rays into the sheet, which depth is selected to be smaller than the thickness of the sheet.

9. A process according to claim 7 or claim 8, wherein crosslinking is effected by irradiation with accelerated electrons.

10. A process according to one of claims 7, 8 or 9, wherein the radiation dose required for a desired penetration depth of the rays is adjusted by varying the acceleration voltage for the high-energy radiation or by altering the distance between the radiation source and the surface of the sheet, or by using preliminary absorber, or by changing the angle of incidence of the rays on the surface of the shaped structure.

11. A sheet of polymeric material, provided with fillers and additives other than vulcanization accelerators, for use as a weather-resistant sealing material, which comprises a sheet of said polymeric material containing an ethylene-propylene-diene terpolymer and/or an ethylene-propylene copolymer which is weldable by heat and/or solvents or swelling agents and which is crosslinkable by high-energy radiation, said terpolymer and/or copolymer being provided in a homogeneous distribution within the sheet and being at least partially crosslinked by exposure to high-energy radiation over a selected portion of the thickness of said sheet starting from one exposed side surface of said sheet and extending into the interior of the sheet, said terpolymer and/or copolymer being sufficiently crosslinked in said selected portion to provide a sheet having a weather resistant side, with the sheet, and that portion thereof which has not been crosslinked by being subjected to high-energy radiation, remaining weldable by heat and/or by solvents or swelling agents to provide weldability to said another portion of the sheet including an exposed side surface of the sheet whereby a weather-resistant sealing sheet having a weather resistant surface and a weldable surface is provided.

12. A process for the manufacture of sheets from an ethylene-propylene-diene terpolymer and/or an ethylene-propylene copolymer containing additives other than vulcanization accelerators which comprises crosslinking at least a portion of one side of a sheet of said terpolymer and/or copolymer by subjecting said at least one portion of the sheet including a surface thereof to an electron beam so that the sheet is crosslinked to a depth which is smaller than the thickness of the sheet, said sheet having a thickness of from 1.0 to 3.0 mm and being subjected to the electron beam at an acceleration voltage of from 400 to 900 keV, a beam amperage of from 25 to 100 mA, and a surface dosage of 1.0 to $1.6 \cdot 10^5$ J/kg.

13. A process according to claim 12, wherein the degree of radiation required for effecting the desired penetration depth of the crosslinking is effected by changing the acceleration voltage of the electron beam.

14. A process acccording to claim 12, wherein the desired penetration depth of the crosslinking is effected by varying the distance between a source of the electron beam and the exposed sheet surface.

15. A process according to claim 12, wherein the extent of the depth of crosslinking effected by the electron beam is varied by use of a thin metal foil acting as a preliminary absorber.

* * * * *